United States Patent
Tai

(10) Patent No.: US 6,644,611 B1
(45) Date of Patent: Nov. 11, 2003

(54) ADJUSTABLE INCLINED ANGLE STRUCTURE FOR COMPUTERS

(75) Inventor: Kuang-Cheng Tai, Hsinchu (TW)

(73) Assignee: Mitac Technology Corp., Hsinchu (TW)

( * ) Notice: Subject to any disclaimer, the term of this patent is extended or adjusted under 35 U.S.C. 154(b) by 0 days.

(21) Appl. No.: 10/160,047

(22) Filed: Jun. 4, 2002

(51) Int. Cl.$^7$ ................................................. E04G 3/00
(52) U.S. Cl. .................. 248/292.13; 248/923; 248/397; 361/681; 403/93
(58) Field of Search ............................ 248/284.1, 291.1, 248/292.13, 292.14, 371, 393, 395, 397, 398, 919, 922, 923, 176.1, 185.1, 178.1, 176.3, 921; 403/84, 92, 93, 94, 95, 96, 98, 103, 107; 361/681, 682; 16/319, 321, 322, 326, 327, 332, 343, 345, 348, 352, 357

(56) References Cited

U.S. PATENT DOCUMENTS

| | | | | |
|---|---|---|---|---|
| 2,812,961 A | * | 11/1957 | Brown et al. .................. 403/93 |
| 3,908,561 A | * | 9/1975 | Cowley .......................... 108/6 |
| 3,970,274 A | * | 7/1976 | Resk ........................ 248/185.1 |
| 4,666,327 A | * | 5/1987 | Su ................................ 403/24 |
| 5,001,659 A | * | 3/1991 | Watabe ........................ 361/681 |
| 5,026,028 A | * | 6/1991 | Ooi et al. ...................... 256/67 |
| 5,109,572 A | * | 5/1992 | Park ............................. 16/334 |
| D339,600 S | * | 9/1993 | Sumrall ..................... D16/242 |
| 5,335,142 A | * | 8/1994 | Anderson ................... 361/681 |
| 5,678,896 A | * | 10/1997 | Chung ................... 297/411.38 |
| 6,018,847 A | * | 2/2000 | Lu ............................... 16/337 |
| 6,062,584 A | * | 5/2000 | Sabol ......................... 280/607 |
| 6,147,858 A | * | 11/2000 | Takahashi ................... 361/680 |
| 6,164,611 A | * | 12/2000 | Kuhnke ................... 248/279.1 |
| 6,357,712 B1 | * | 3/2002 | Lu .......................... 248/291.1 |

* cited by examiner

Primary Examiner—Ramon O. Ramirez
Assistant Examiner—Jon Szumny
(74) Attorney, Agent, or Firm—Birch, Stewart, Kolasch & Birch, LLP

(57) ABSTRACT

An adjustable inclined angle structure of a computer. It mainly uses a pair of rotating disks to adjust and fix the inclined angle of a computer when it is installed. One of rotating disks use a handlebar with spring pin to buckle up with dividing holes of the rotating disk to fix the inclined angle. Another rotating disk has a long hole corresponding to an anchor element to limit a starting point and an end point of inclined angle travel caused by the above-mentioned dividing holes so that it can be used to adjust the inclined angle of computer, and avoid falling down due to an over-adjustment.

15 Claims, 9 Drawing Sheets

ADJUSTABLE INCLINED ANGLE STRUCTURE FOR COMPUTERS

TECHNICAL FIELD

The present invention relates to a structure for adjusting the incline angle of a computer, applied to industrial computers that can be separated from a base, and more particularly to a structure that can adjust an inclined angle of an industrial computer.

TECHNICAL BACKGROUND

Generally speaking, most industrial computers are designed to be portable so as to provide convenience for users. On the other hand, when the computer must be used on a table or platform, we must use a mechanism to stand it up so as to allow the user to see the screen. So that users can have a better viewing angle, a structure that can incline to a particular angle is designed and later attached to the above-mentioned structure. However, because different users have different desired viewing angles, such a design cannot satisfy every user's needs. In addition, a user needs not only to assume a standing posture to view the computer screen, but also to adopt other postures to change the viewing angle to view the screen of the computer. For example, an automobile repair mechanic needs to take a standing posture (downward viewing angle) to see the computer screen, and he also needs to take a upward viewing angle to see the screen when a car chassis is checked. So, the above-mentioned structure that provides only one viewing angle is not the best choice for a single user or different users. Therefore, another mechanism is necessary that is designed to provide users with various viewing angles so as to conform to theirs needs.

SUMMARY OF THE PRESENT INVENTION

The main object of the present invention is to provide a structure for adjusting the incline angle of a computer. It not only provides users with different viewing angles, but also can limit the starting and end points of the incline angle, so as to avoid over-adjustment which can cause the computer to lose its center of gravity and fall down.

According to the present invention, a structure for adjusting the incline angle of a computer can be used with an industrial computer, which can be separated from the adjusting structure. The present invention is included of a receiver element, a pair of rotating disks and a base. Each one of the two ends of the outer side of the receiver element is disposed with the rotating disk respectively, and the inner side of the base contacts with the outer sides of the two rotating disks.,When it is being used, one should first rotate the receiver element, and then use a handlebar with spring pin opposite the rotating disk to buckle up the dividing holes of the rotating disk, so as to let the receiver element fix at the proper inclined angle. Finally the anchor element is used to lock it. The incline angle will then be more firmly fixed. When the receiver element is rotating, long holes are utilized to limit the starting and end points of the incline angle, to prevent the computer from falling down.

DETAILED DESCRIPTION OF THE PRESENT INVENTION

The adjustable incline angle structure disclosed by the present invention is mainly for use with industrial computers that can be separated from the present invention. The present invention can provide different incline angles when it is located on a platform, enabling users to view pictures displayed on the screen from all different directions.

Figure 1:
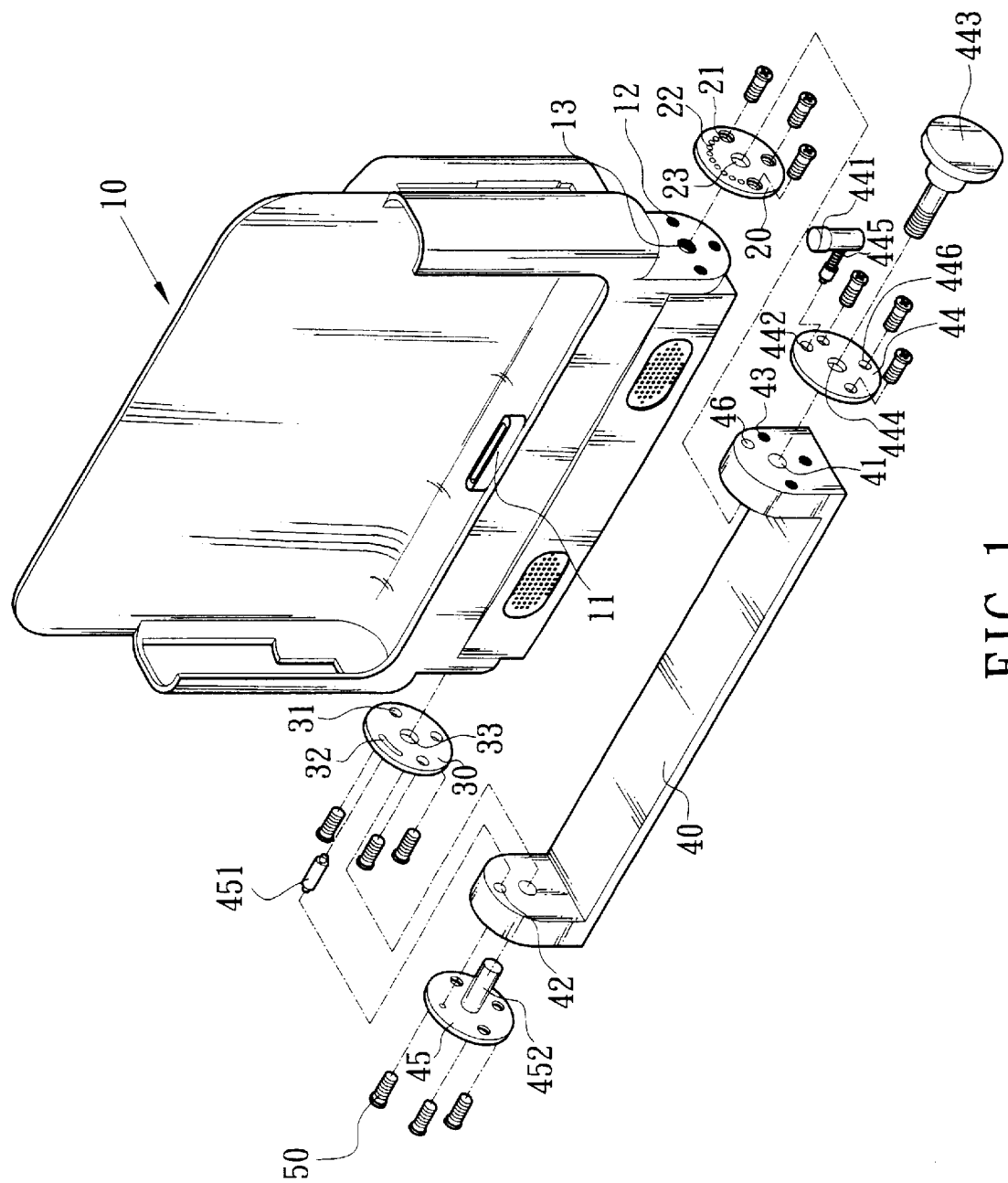
FIG. 1 is an exploded view of the present invention.
Figure 2:
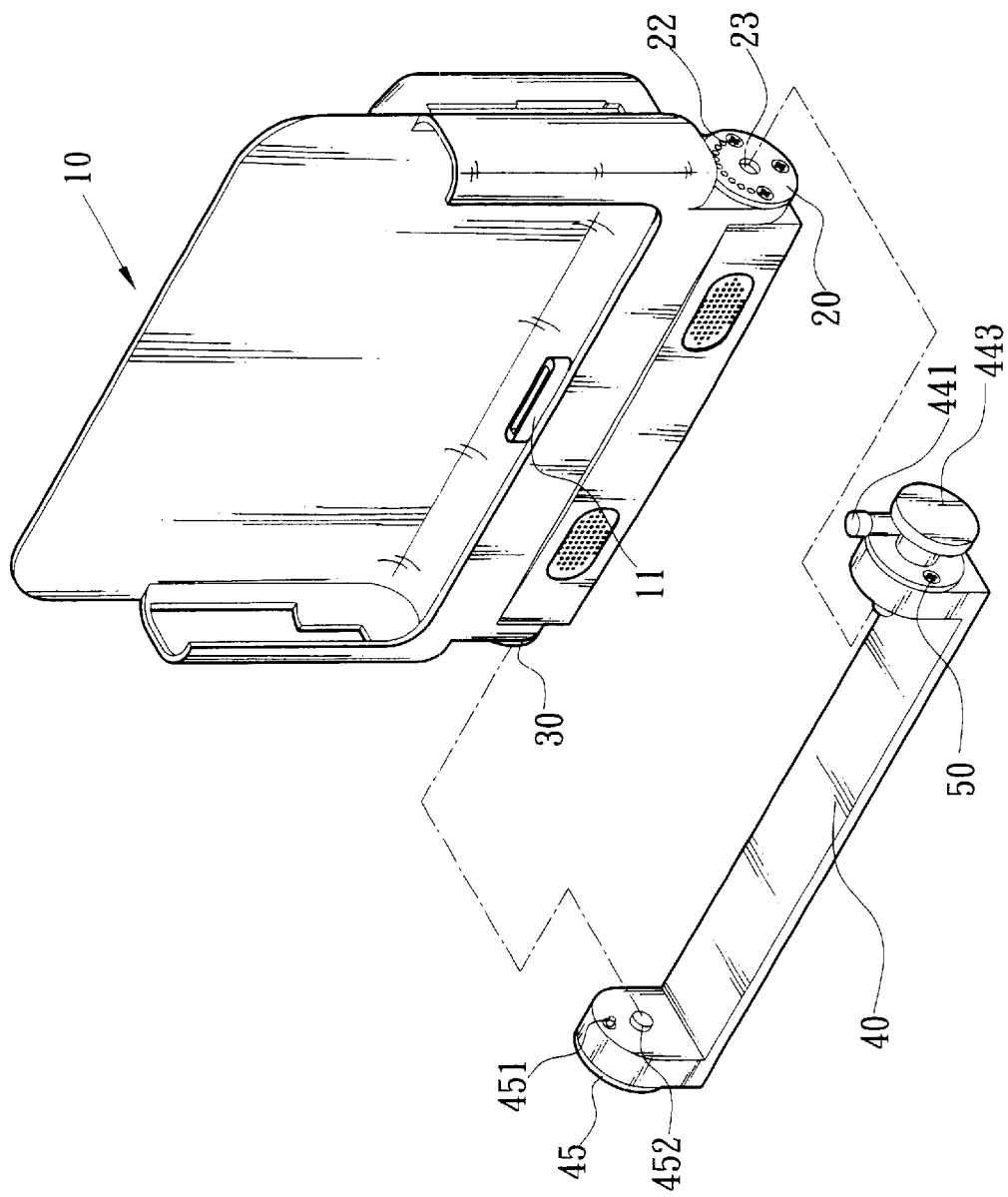
FIG. 2 is a partly exploded view of the present invention.
Figure 3:
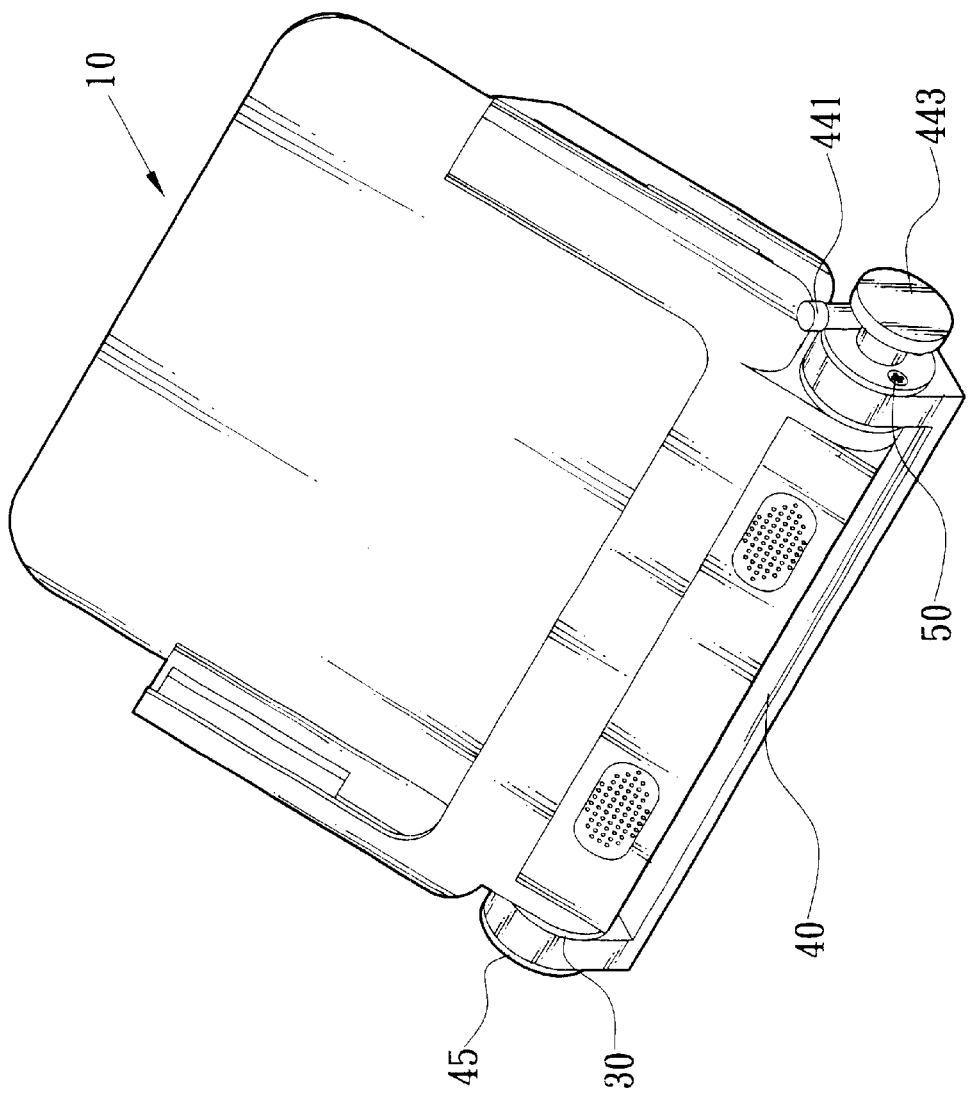
FIG. 3 is a perspective view of the present invention.

As shown in FIGS. 1, 2 and 3, the present invention is mainly included of a receiver element 10, a pair of rotating disks and a base 40. The disks consist of a first rotating disk 20 and second rotating disk 30.

Figure 4:
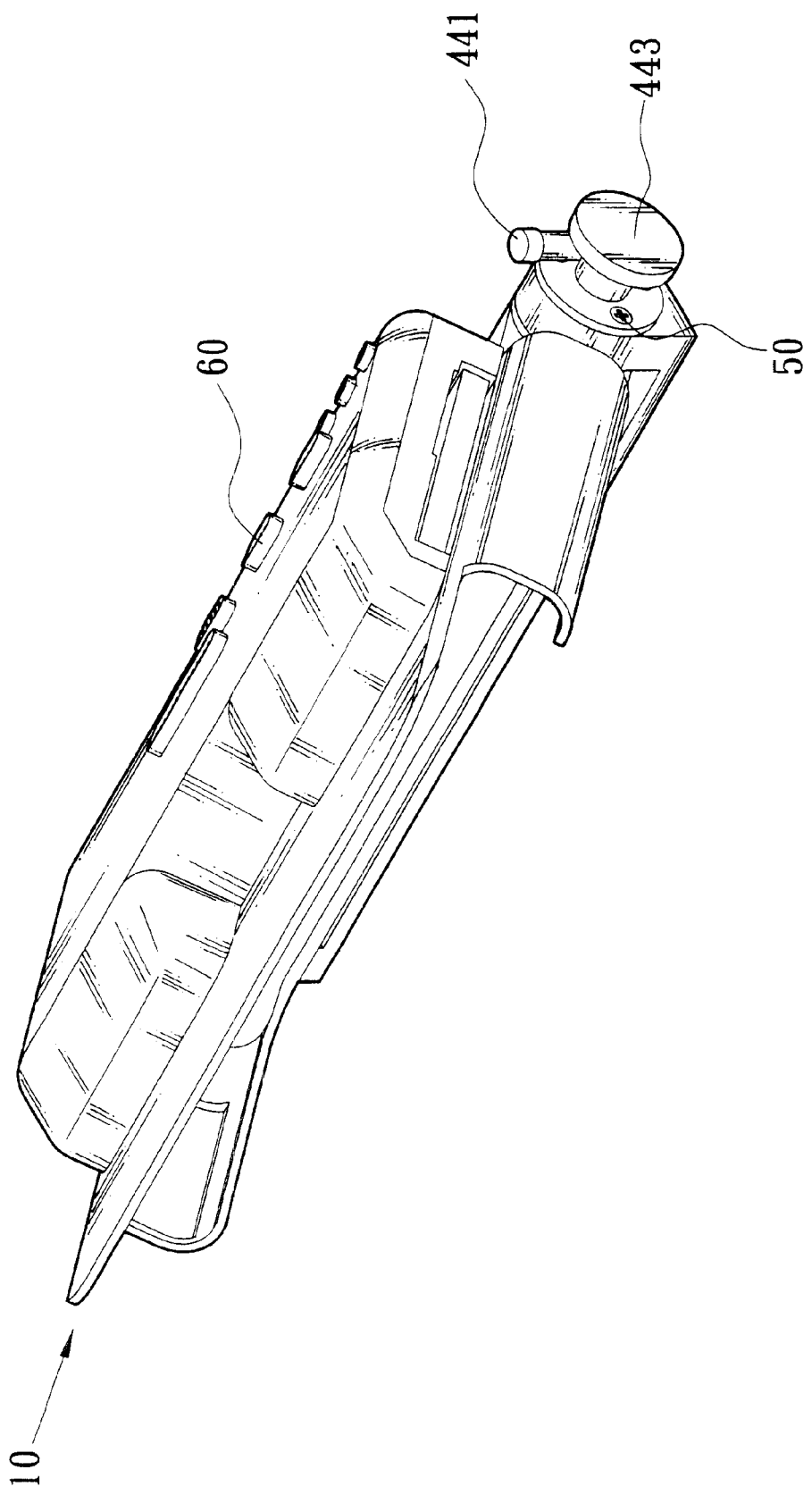
FIG. 4 is another perspective view of the present invention, showing a structure of the present invention at another inclined angle.

A front plate, rear plate, and bottom plate connecting two side plates compose the receiver element, so as to form a receiving space for the industrial computer. A plug 11 is disposed at the proper position on the inner side of the bottom plate so as to let the jack (not shown in the figures) of the industrial computer connect with the plug 11 when the industrial computer is positioned in the receiving space of the receiver element 10. Open holes 12 and a circular hole 13 (the circular hole 13 is drilled with a screw) at the outer side of one of the two plates are opened at each side plate of the receiver element 10, and an insertion opening 60 is disposed at the outer side of the rear plate for connecting with other equipment peripherals, as shown in FIG. 4.

The first rotating disk 20 is installed on the outer side of the side plate upon which the circular hole 13 with screw is disposed, and open holes 21, a dividing hole 22 and a circular hole 23 are opened therein. The open holes 21 correspond to the open holes 12 of the receiver element 10, and are utilized to let screws 50 pass through open holes 21 and open holes 12 to lock the first rotating disk 20 onto the receiver element 10. The dividing hole 22 is opened, taking the approximate line of the arc of the circumference of the first rotating disk, and the circular hole 23 corresponds to the circular hole 13 of the receiver element 10.

The second rotating disk 30 is disposed at the outer side of the other side plate of the receiver element 10, and open holes 31, a long hole 32 and a circular hole 33 are opened therein. The open holes 31 correspond to the open holes 12 of the receiver element 10 to let the screws 50 pass through the open holes 31 and open holes 12 to lock the second rotating disk 30 onto the receiver element 10. The long hole 32 is opened, taking a line similar to the arc of the circumference of the second rotating disk 30, and the circular hole 33 corresponds to the circular hole of the receiver element 10.

The base 40, constructed by a bottom plate and two side plates connected to the two ends thereof, forms a shape similar to a "U", with a bottom line much longer than the two side lines. The inner sides of both side plates connect with the first rotating disk 20 and second rotating disk 30 respectively. A circular hole 41, a through hole 42, open holes 43 and a fixing hole 46 are opened in the base 40. A circular hole 41 is opened at each side plate. One hole, the position of which corresponds to the circular hole 23 and circular hole 13, is opened on the inner side of the side plate that contacts with the first rotating disk. The other hole, the position of which corresponds to the circular hole 33 and circular hole 13, is opened on the inner side of the side plate that contacts with the second rotating disk 30. The through hole 42 is opened on the side plate that contacts with the second rotating disk 30, and the through hole 42 can correspond to any position at a length formed by the long hole 32. The open holes 43 are opened on each side plate. The fixing hole is opened on the side plate that contacts with the first rotating disk 20.

Figure 6:
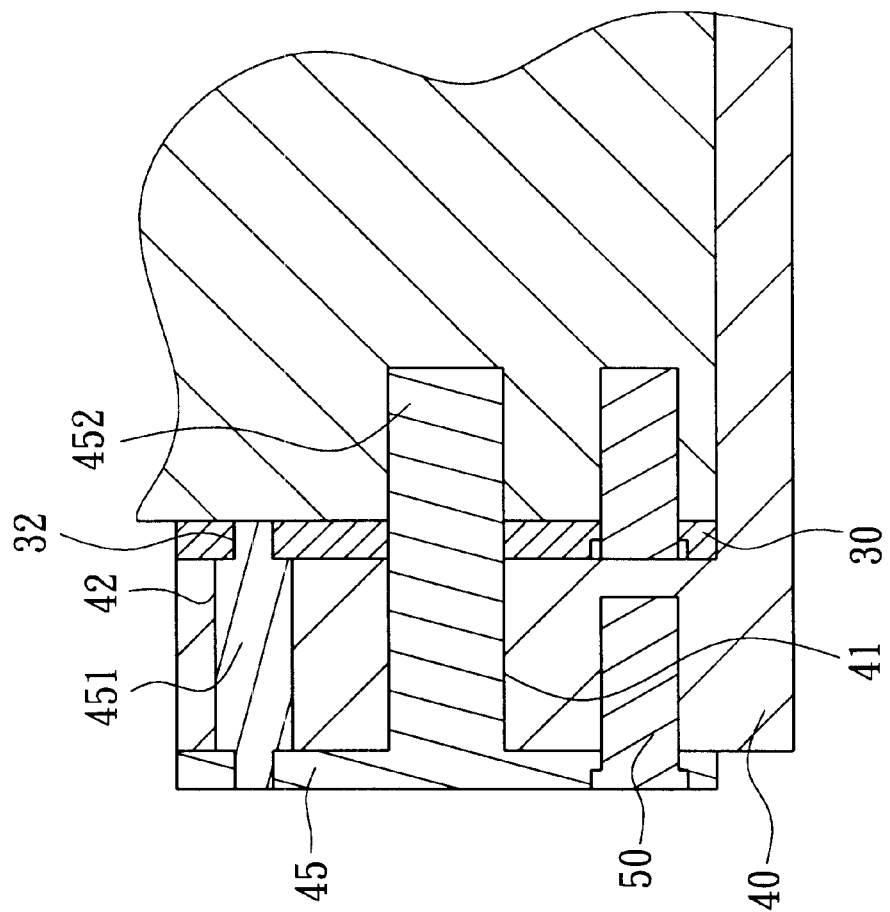
FIG. 6 is a cross-sectional view of the present invention.

The base 40 is further included of a pair of fixer rotating disks (a first fixer rotating disk and a second fixer rotating disk) that each have open holes, and screws pass through the open holes 446 of the fixer rotating disks and the open holes 43 of the base 43 to lock them onto the base 40. The first fixer rotating disk 44 and second fixer rotating disk 45 are both disposed at the two opposite outer sides of the base 40 and are corresponding to the first rotating disk 20 and second rotating disk 30 at the inner sides of the side plates of he base 40 respectively, they are utilized to limit the rotations of the first rotating disk 20 and second rotating disk 30 (thereby, the rotation of the receiver element 10 can be limited). The second fixer rotating disk 45 also includes a restraint element 451 and shaft 452, one end of the restraint element 451 is disposed in the second fixer rotating disk 45 (as shown in FIG.6), another end thereof is disposed in the long hole 32 of the second rotating disk 30, and the middle part thereof is positioned in the through hole 42 of the base 40. The restraint element 451 is utilized to limit the rotation of the second rotating disk 30 and avoid an over-adjustment to lose the gravity center and to fall down. The shaft 452 passes through and pivots in the circular hole 41 of the base 40, the circular hole 33 of the second rotating disk 30 and the circular hole 13 of the receiver element 10. The first fixer rotating disk 44 has a handlebar 441, fixing hole 442, anchor element 443, circular hole 444 and spring 445 disposed in the handlebar 441. the handle bar 441 is passed through the fixing hole 442, the fixing hole of the base 40 and dividing hole 22 successively to fix the inclined angle between the receiver element 10 and the platform placed by the present invention, and then, the anchor element 443 is passed through and locks the circular holes 444, 41, 23 and 13 of the first fixer rotating disk 44, base 40, the first rotating disk 20 and the receiver element 10 to fix the present invention.

Figure 7A:
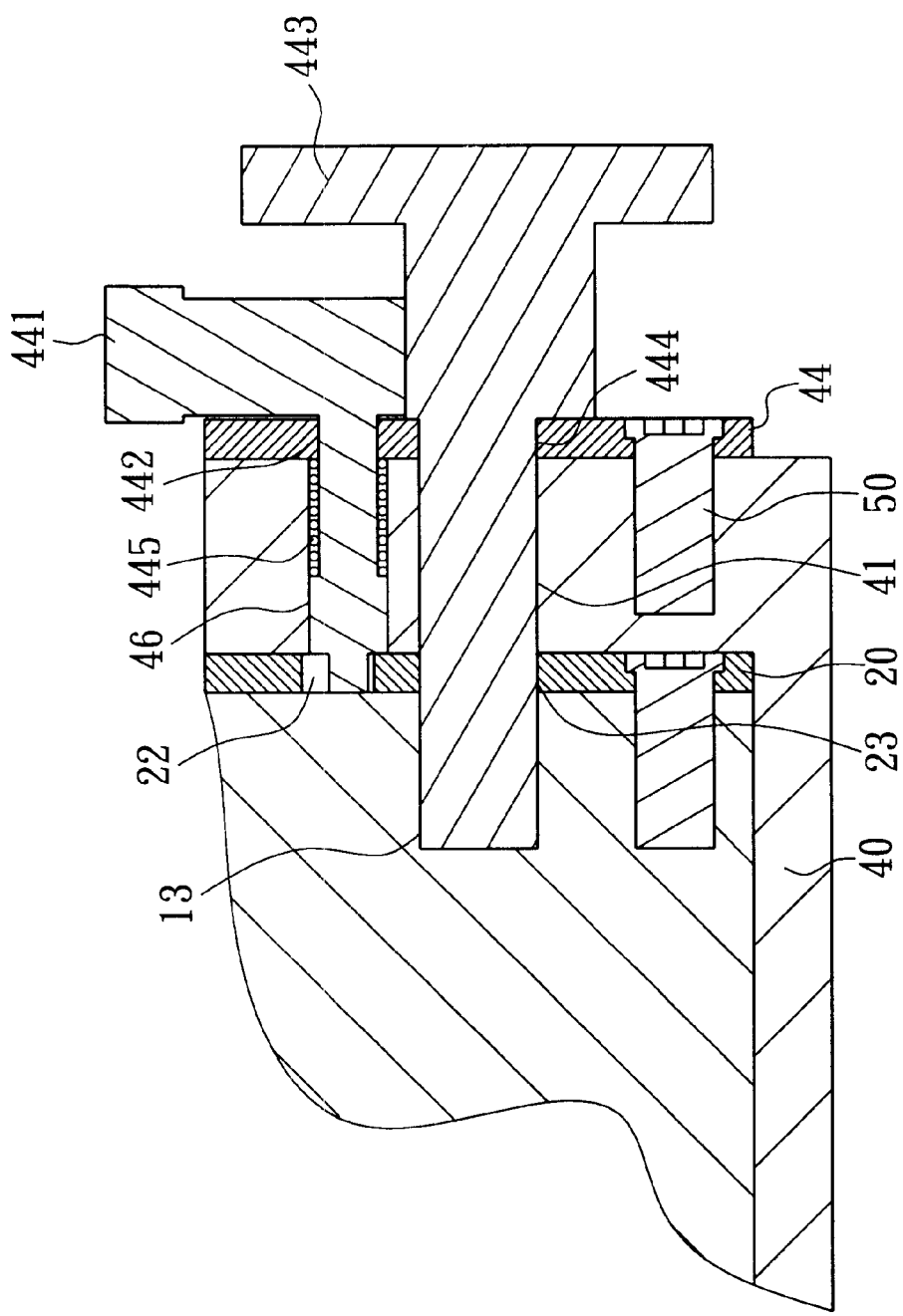
FIGS. 7A, 7B and 7C are diagrams of the present invention, illustrating movements of the present invention.
Figure 7B:
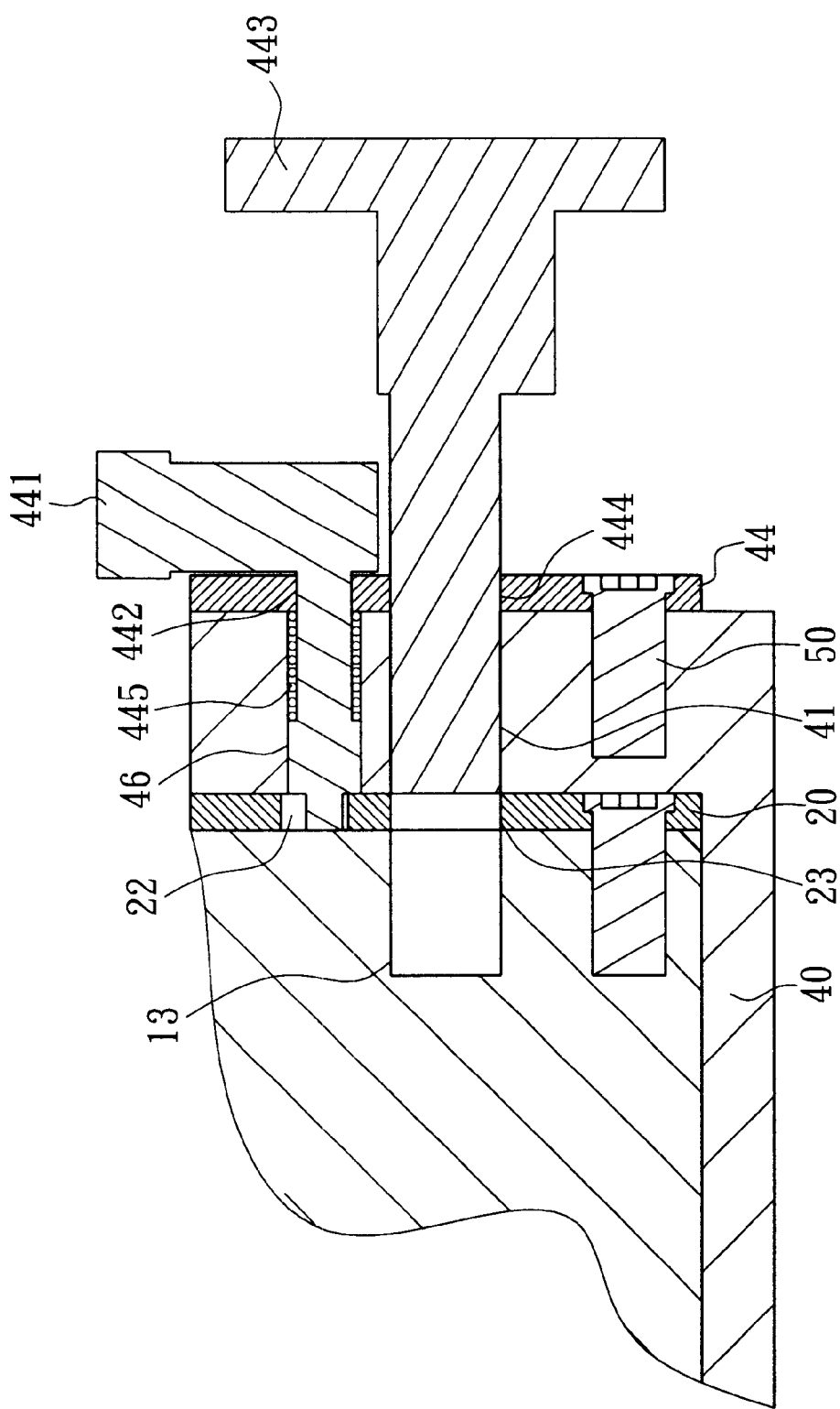
Figure 7C:
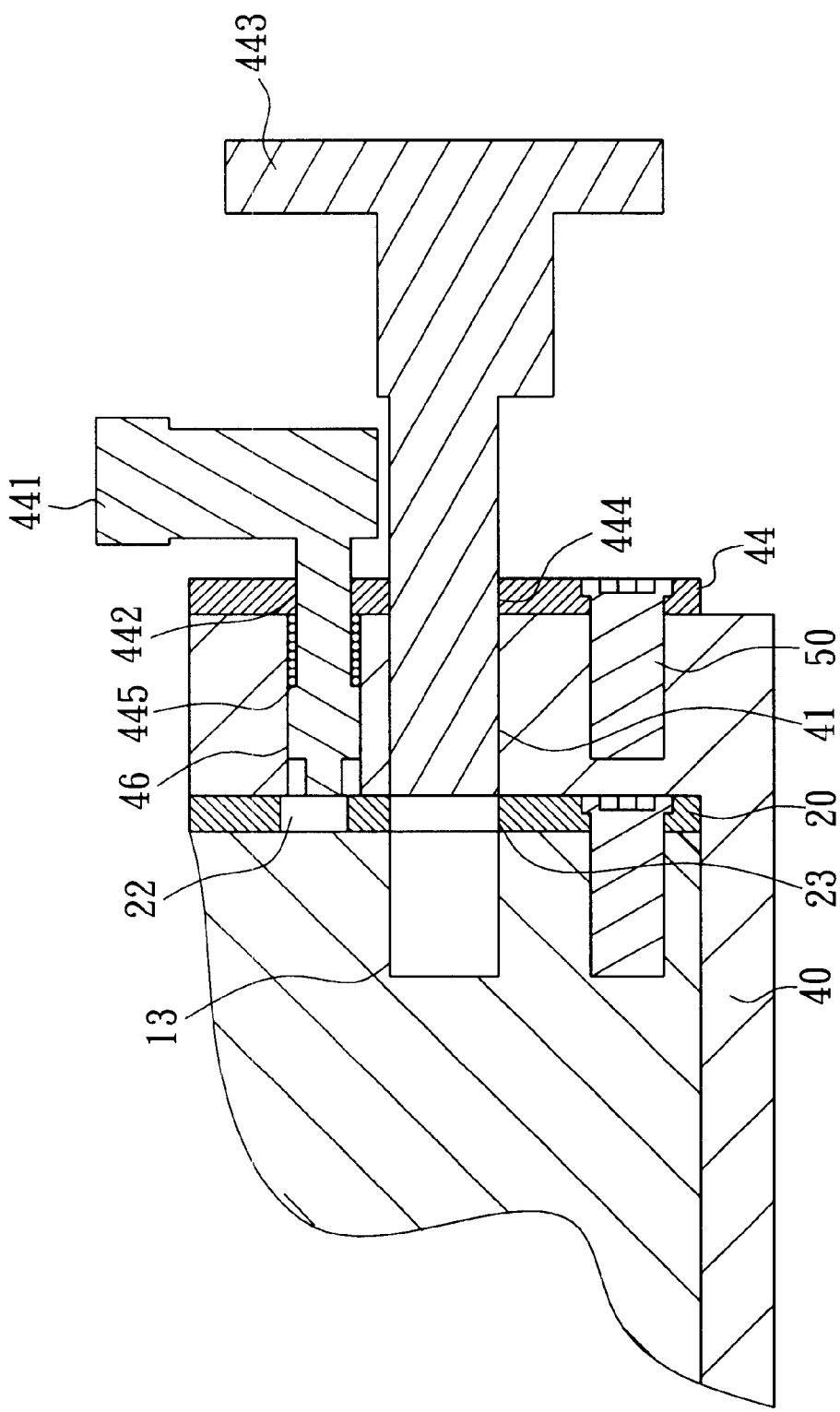

Please refer to FIGS. 7A, 7B and 7C, when an inclined angle needs to be changed, we may rotate the anchor element 443 to let it separate from the circular 13 and 23, and pull handlebar 441 (the spring 445 is compressed to store internal energy at that time) out of the dividing hole 22 (please refer to FIG. 1 the receiver element 10 also can use the restraint element 451 to limit the travel of its moving angle even if the receiver element 10 isn't supported with the hand at that time, this can avoid the receiver element 10 to fall down suddenly to collide with the platform placed by the present invention to damage the industrial computer), and then after rotate the receiver element to a proper angle, release the handlebar 441 (use the recovering force of the spring 445) and buckle the handlebar 441 in another dividing hole 22, after that, lock the anchor element 443 in the circular hole 13. Thereby, the present invention can be locked at an inclined angle suitable for users to view, as FIG. 3 and 4 shown.

Figure 5:
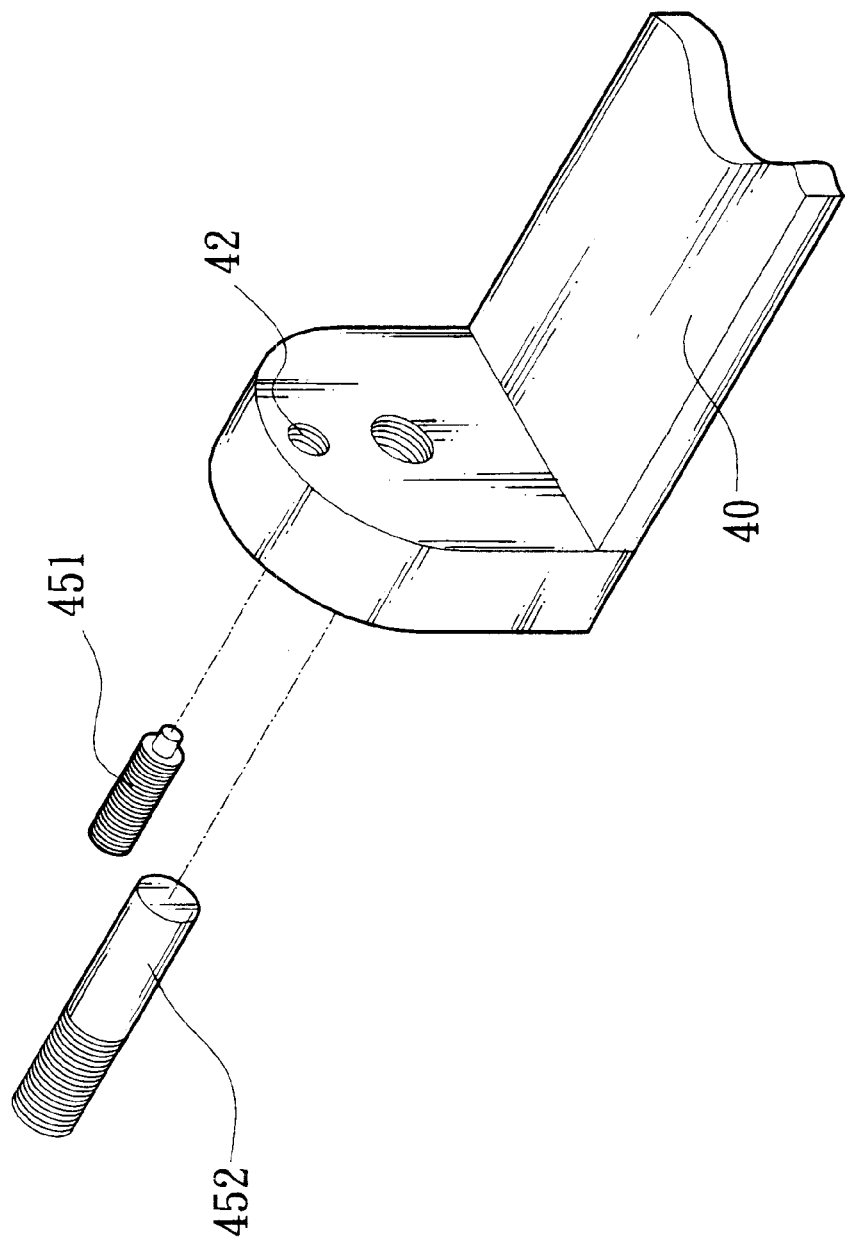
FIG. 5 is partly exploded view of another preferred embodiment of the present invention, showing a structure of another fixer rotating disk.

As FIG. 5 shown, the second fixer rotating disk 45 can be changed to a shaft 452, and a part of the shaft 452 has external screw (corresponding to the circular hole 41 of the base 40, therefore, in this preferred embodiment of the present invention, the circular hole 41 of the side plate of the base 40 contacted with the second fixer rotating disk 45 also needs to be provided with an inner screw. Both inner and external screws are exchangeable for certain, it will also attain the same effect locking both together), and an external screw is also disposed at one end of the restraint element 451. Similarly, an inner screw needs to be disposed in the through hole 42 to be in coordination with the external screw and to let the restraint element to be whirled in to fix. When the present invention is in use, the restraint element 451 is also utilized to limit the travel of the moving angle of the receiver element 10 (use the starting and end points of the length opened by the long hole 32), and the shaft 452 is also used to pivot the receiver element 10.

The structure of adjustable inclined angle of computer according to the present invention can provide the following effects:

1. for the reason that the inclined angle of the receiver element can be adjusted, users can take different viewing postures to see pictures on the screen.
2. the use of the receiver element and handlebar can make the inclined angle to be more fixed. Therefore, the present invention can be used in a severe vibration occasion (such as, a factory furnished with machines easy to be aroused with vibration).
3. the restrain element can limit the travel of the moving angle of the receiver element, that the industrial computer collides with the platform placed by the present invention suddenly to cause damage will not happen when the angle is adjusted.

It is to be understood that the drawing is designed for purpose of illustration only, and is not intended for use as a definition of the limits and scope of the invention disclosed.

What is claimed is:

1. An adjustable inclined angle structure of a computer, comprising:
    a receiver element, having a receiving space for a computer;
    a pair of rotating disks, having a first rotating disk and a second rotating disk, fixed at the two opposite outer sides of said receiver element, and said first rotating disk having a plurality of dividing holes opened in an arc-shaped arrangement;
    a base, installed at a position relative to the outer sides of said pair of rotating disks for movement relative to said receiver element, having a handlebar utilized to insert into said diving holes of said first rotating disk to fix an inclined angle between said base and said receiver element, the base further having a first fixer rotating disk, a shaft, and a restraint element, one end of the restraint element being inserted in said first rotating disk and another end thereof being lockable into a through hole of said base to limit a rotating angle of said rotating disk.

2. The structure of claim 1, wherein said receiver element has a plug installed in an inner side thereon for connecting to a jack of a computer installed in said receiving space of said receiver element.

3. The structure of claim 1, wherein said receiver element has at least one insertion opening disposed at an external side thereon for connecting with equipment peripherals.

4. The structure of claim 1, wherein said second rotating disk has a long hole, and the shape of said long hole is an arc.

5. The structure of claim 1, wherein said pair of rotating disks further includes a plurality of screws and a plurality of open holes, and said receiver element has open holes corresponding to said open holes of said rotating disks so as to lock said rotating disks onto said receiver element.

6. The structure of claim 1, wherein the first fixer rotating disk of said base comprises one of a pair of fixer rotating disks corresponding to said pair of rotating disks installed at the external side of said base, and said pair of fixer rotating disks are constructed by the first fixer rotating disk and a second fixer rotating disk.

7. The structure of claim 6, wherein said second fixer rotating disk further comprises a restraint element, an end thereof is installed in said second fixer rotating disk, another end thereof is installed in said second rotating disk, and a middle part thereof is placed in a through hole of said base to limit a rotating angle of said second rotating disk.

8. The structure of claim 6, wherein said second fixer rotating disk has a shaft, and said second rotating disk and said base each has a circular hole disposed at a position corresponding to said shaft for said shaft to pass through.

9. The structure of claim 6, wherein said first fixer rotating disk has a through hole, and said handlebar passes through said through hole, a fixing hole of said base and one of said dividing holes successively to fix said inclined angle between said receiver element and said base.

10. The structure of claim 6, wherein said first fixer rotating disk further comprises an anchor element, and said anchor element passes through said base and said rotating disk, and is locked with said receiver element.

11. The structure of claim 6, wherein said first fixer rotating further comprises a plurality of screws and a plurality of open holes, and said base has open holes corresponding to said open holes of said fixer rotating disk for locking said fixer rotating disk.

12. The structure of claim 1, wherein said shaft passes through a circular hole of said base corresponding to said shaft.

13. The structure of claim 1, wherein said first fixer rotating disk further has a through hole, and said handlebar passes through said through hole, a fixing hole of said base and one of said dividing holes to fix an inclined angle between said receiver element and said base.

14. The structure of claim 1, wherein said first fixer rotating disk further comprises an anchor element, said anchor element passes through said base and said first rotating disk to be locked onto said receiver element.

15. The structure of claim 1, wherein said first fixer rotating disk further comprises a plurality of screws and a plurality of open holes, and said base has open holes corresponding to said open holes of said first fixer rotating disk to lock said fixer rotating disk onto said base.

* * * * *